(12) United States Patent
Smoot

(10) Patent No.: US 7,982,450 B2
(45) Date of Patent: Jul. 19, 2011

(54) DEVICE AND METHOD ALLOWING THE DETECTION AND DISPLAY OF OBJECTS LOCATED BEHIND AN OBSCURING SURFACE

(76) Inventor: Lanny S Smoot, Thousand Oaks, CA (US)

( * ) Notice: Subject to any disclaimer, the term of this patent is extended or adjusted under 35 U.S.C. 154(b) by 336 days.

(21) Appl. No.: 12/371,385

(22) Filed: Feb. 13, 2009

(65) Prior Publication Data

US 2009/0230945 A1   Sep. 17, 2009

Related U.S. Application Data

(60) Provisional application No. 61/028,430, filed on Feb. 13, 2008, provisional application No. 61/029,635, filed on Feb. 19, 2008.

(51) Int. Cl.
*G01R 31/08* (2006.01)
*G01R 27/26* (2006.01)

(52) U.S. Cl. ........... 324/67; 324/519; 324/658; 324/686

(58) Field of Classification Search ........................ None
See application file for complete search history.

(56) References Cited

U.S. PATENT DOCUMENTS

| | | | |
|---|---|---|---|
| 4,099,118 A | 7/1978 | Franklin et al. | |
| 4,853,617 A | 8/1989 | Douglas et al. | |
| 4,992,741 A | 2/1991 | Douglas et al. | |
| 5,485,092 A | 1/1996 | Fortin | |
| 5,617,031 A | 4/1997 | Tuttle | |
| 5,774,091 A | 6/1998 | McEwan | |
| 6,198,271 B1 | 3/2001 | Heger et al. | |
| 6,249,113 B1 * | 6/2001 | Krantz et al. | 324/67 |
| 7,053,599 B2 | 5/2006 | Clauss et al. | |
| 7,116,091 B2 | 10/2006 | Miller | |
| 7,148,703 B2 * | 12/2006 | Miller | 324/662 |
| 2007/0200547 A1 * | 8/2007 | Chen | 324/67 |
| 2007/0210785 A1 * | 9/2007 | Sanoner et al. | 324/67 |

* cited by examiner

*Primary Examiner* — Ha Tran T Nguyen
*Assistant Examiner* — Emily Y Chan
(74) *Attorney, Agent, or Firm* — Thomas A. Runk; Fulwider Patton LLP

(57) ABSTRACT

A handheld device providing an internal view through an obscuring wall or other obscuring surfaces of hidden structural or facilities elements (such as wooden studs, electrical, plumbing, or HVAC), or the absence thereof. A continuous and homogeneous luminescent gas or other visual display material whose optical characteristics change as a result of the applied electric field is used both to simultaneously detect capacitance changes associated with hidden objects and to display those detected those objects. Different types of chambers are disclosed for the gas as well as means to prevent fringing effects. The gas is held just at its ionization level at which point it becomes optically visible. Circuitry is disclosed for controlling the energy source based on current draw or light output of the gas and feedback circuitry is disclosed to neutralize the effects of ambient light. Also disclosed is a device and method for the detection and mapping of electric fields.

16 Claims, 8 Drawing Sheets

DEVICE AND METHOD ALLOWING THE DETECTION AND DISPLAY OF OBJECTS LOCATED BEHIND AN OBSCURING SURFACE

CROSS-REFERENCES TO RELATED APPLICATIONS

This application claims priority from U.S. Provisional Application No. 61/028,430, filed Feb. 13, 2008, and U.S. Provisional Application No. 61/029,635, filed Feb. 19, 2008, both of which are incorporated by reference in their entireties.

BACKGROUND

The invention relates generally to the detection of objects hidden behind an obscuring surface, and more particularly, to a device and method that use a gas to both detect and display the existence of the hidden objects.

Often in the fields of building construction, renovation, and repair, it would be desirable to generate an "X-Ray" type of view of walls, floors, ceilings, and other obscuring surfaces to find the exact locations of any structural or facilities members hidden behind them. In many cases for safety purposes, it is essential to locate any pipes, wires, or conduits before any penetration of an obscuring wall, floor, or ceiling surface occurs. In other cases, there is a need to find the exact location of a stud or other bracing member behind the obscuring wall surface to use as a strong support for mounting a heavy object to the wall, such as a mirror. The mounting screw or screws of the object to be hung must penetrate not only the wallboard, but also the stud since wallboard by itself is typically is not strong enough to hold up heavy objects.

One option to determine what exists behind an obscuring wall is to remove the wall or a part of it. This can be expensive and time consuming. Carpenters for instance, would vastly profit from the ability to plan improvements without the need for opening an existing wall. Such wall openings cause an even greater amount of work due to the required repair, closing, and patching of those walls. Electricians and plumbers would enjoy the ability to determine the exact locations of various obstructions and clear areas behind obscuring wall surfaces so that they could more easily plan their wire or pipe runs. Being able to determine the existence of pipes, wires, conduits, studs, bracing members, and other features would make projects much easier, more efficient, and in many cases, much less expensive.

Home inspectors would like to be able to determine whether various contractors and homeowners have done their work according to applicable construction codes and whether the materials and fabrication techniques are according to applicable requirements. In most cases, construction inspections are required before an obscuring surface is erected. However, cases have arisen, due to timing or other events beyond the control of those involved, where an obscuring surface is put in place before the required inspection could be performed. In such a case, verifying that proper construction techniques were used may require removal of the wall or other obscuring surface, or at least opening access ports through the wall to allow visual inspections. This leads to the additional time and expense to close the (often multiple) access ports of the wall. Because existing devices and methods do not adequately permit an inspector to check construction materials and techniques that are hidden from view behind an obscuring wall, removal of the wall is the only option in some cases. However, if a device and method were provided that would give the inspector a clearer view of the hidden object or construction techniques, such a device and method may enable an inspector to approve the completed construction without requiring that the wall be removed.

Being able to obtain a display of what is located behind a wall, floor, or ceiling surface is desirable for various purposes, such as locating cavities in floor surfaces, joists, and other areas, determining where fasteners should go when assembling any type of non-conductive structures, locating studs behind plastic, or glass walls, and locating live or non-live wires. Other situations would also benefit from a detector or scanner that can provide an image of the structure or features behind an obscuring surface. For example, it is desirable to be able to scan for hidden wall cavities in buildings, scan for hidden compartments in airplane internal cabin structures, analyze non-ferrous boat hulls to determine hidden contraband cavities and/or metal sub-structures, locating hidden items in suitcases, locating contraband at schools and in other places.

Various technologies have been proposed to avoid having to open an obscuring wall to find objects located behind that wall. These range from a simple metal detector comprising a pivoting magnet, to more complex metal detectors (see U.S. Pat. No. 4,853,617), to capacitive sensor systems, to a short-range radar system (see U.S. Pat. No. 5,774,091). A simple "stud finder" has been available for many years that may be used to find the vertical support studs of a wall. In perhaps the simplest case, the stud finder comprises only a magnet mounted so that it may pivot towards ferrous material, such as metal nails, that are used to attach studs to a bottom plate for example. Perhaps the most successful technology used in detecting objects located behind concealing surfaces is the capacitive sensor.

Capacitive detector devices and methods have been provided with many different circuits used to implement them. There are, however, drawbacks to such devices one of which is that they are incremental in nature. They are referred to as being "incremental" because they use discrete capacitive components that are able to provide a detection area that is only as large as the capacitive component itself. Adding additional capacitive components has been attempted but the cost an circuit complexity also undesirably increase. Additionally, a separate display device is needed so that the operator can see what the capacitive detector has detected. Separate displays increase the cost as well as the possibility of failure. In many cases, only one or just a few capacitors are used as detectors. Because of this, and even if they use light emitting diodes (LEDs) or even liquid crystal displays (LCDs), they do not provide a seamless and high resolution picture of the objects behind the obscuring surface. They are limited by the size of the capacitive plate or capacitive sensor device used.

Some effort has been made to provide higher resolution images from capacitive detectors by using more capacitor plates for detection or by providing circuits that control fringe effects in capacitors or provide other such improvements that detract from resolution or accuracy. For example, in one case three capacitive sensors are used, each of which has its own LED display device (see U.S. Pat. No. 6,198,271 to Heger et al.). Regardless of these so-called improvements, such capacitive detector devices provide detection using discrete elements. Providing greater and greater numbers of discrete capacitive detector devices or arrays of detectors in a single housing would cause the need for more wiring, more circuits, and more displays or display elements, all of which can increase the cost and size of a detector significantly. Even then, the detection display will remain incremental in nature and may not provide a seamless picture of the objects behind the obscuring surface. It should also be pointed out that detectors that use discrete devices, such as individual capacitors referred to above, can result in a level of accuracy limited by the size of the discrete device that may still prove to be undesirable.

As used herein, "discrete device" or "discrete component" refers to an electronic component with just one circuit element, either passive (for example, resistor, capacitor, inductor) or active (for example, transistor, diode), as opposed to an integrated circuit that comprises a plurality of miniature components, such as transistors, and other electronic components on a thin rectangle of silicon or other material. An integrated circuit can contain dozens, hundreds, or millions of electronic components.

Such discrete capacitive detection devices and methods only allow the user or operator to determine the presence or absence of structural, wiring, or plumbing members directly under the device. Although the user can physically move the device over the surface of the wall and thereby crudely "map" sub-surface objects, the user is not provided with an integrated, seamless, and contextual "picture" of the undersurface structure.

There has also been identified a need to detect and display the electromagnetic fields of energy sources. Locating the radiating energy source and observing its energy field result in a benefit because, for instance, these fields often interfere with the operation of sensitive electronic equipment in their proximity, and being able to precisely locate and then mitigate against these fields would be efficacious. There has also been speculation in the health community as to whether human exposure to strong electric fields may have detrimental effects on people exposed to them. It would be desirable to provide a detector that can allow detection, localization, and visual mapping of these fields.

Hence, those skilled in the art have recognized a need for a higher resolution device with which hidden objects located behind an obscuring surface may be detected and displayed. A further need has been recognized for a device that uses a display that matches the resolution of the detector of the hidden objects so that a more accurate picture of the objects located behind an obscuring surface may be visualized. It has been further recognized that a detector device that does not need a separate display from the detector component would be desirable. Needs for operation at higher efficiency and a lower cost to manufacture such a device have also been recognized. Furthermore, a device and method for detecting and mapping an electromagnetic radiation source and its electromagnetic fields has also been recognized as desirable. The subject invention satisfies these needs and others.

SUMMARY OF THE INVENTION

In accordance with aspects of the invention, there is provided a device for detecting and displaying an object hidden behind an obscuring surface, the hidden object having a dielectric constant, the detecting and displaying device comprising an energy source, an electrode connected to the energy source, a chamber disposed between the electrode and the obscuring surface, comprising a visual display material disposed in the chamber between the electrode and the hidden object, the visual display material having a visual display characteristic that is varied in response to the amount of energy applied to it by the electrode and in response to the dielectric constant of the hidden object, and a display area through which the visual display characteristic of the visual display material can be seen, wherein a change in capacitance caused by the hidden object is detected by the visual display material and the shape of the hidden object is displayed in the display area of the chamber by the varying of the visual display characteristic of the display material, whereby the visual display material is used to both detect and display the hidden object.

In more detailed aspects in accordance with the invention, the device for detecting and displaying further comprising a controller circuit configured to control the application of energy to the electrode from the energy source to expand or contract a depth of view of the electrode and the visual display material combination. In another aspect, the electrode comprises the transparent area through which the visual display characteristic of the visual display material can be seen. Further, the device for detecting and displaying comprises a guard ring located about the electrode, the guard ring connected to the energy source wherein the guard ring shields the electrode, hereby electric fringing effects that would otherwise occur at the periphery of the electrode are inhibited. In another aspect, the frequency of the energy source is controlled to cause the visual display characteristic to flash the shape of the hidden object.

In other detailed aspects, the visual display material comprises a luminescent gas. In another aspect, the luminescent gas comprises an inert gas. In a further aspect in accordance with the invention, the electrode is configured to receive energy from the energy source and impress a relatively high voltage electric field across the luminescent gas to control ionization of the gas and brightness of display.

In regard to other detailed aspects, the device for detecting and displaying further comprises a controller circuit that controls the energy applied to the gas to maintain the gas substantially near an ionization level at which the gas is just ionized to result in a glow of the g gas. The controller circuit comprises a photo-detector that monitors the amount of light emitted by the gas and controls the energy applied to the gas so that the detected light remains just at the glowing stage. In another aspect, the controller circuit comprises a photo-detector configured to detect light emitted by the gas but not detect ambient light. In yet more detailed aspects, the controller circuit performs a synchronous detection of the emitted light from the luminescent gas, the controller circuit comprises a photo-detector that detects the light emitted by the luminescent gas and provides a detection signal, wherein the energy source produces an electrode signal to drive the electrode, and the controller circuit further comprising a multiplier that multiplies the electrode signal by the detection signal with any resulting DC term fed back to the energy source, wherein the energy source is responsive to the fed back DC term to control the energy application.

In an associated method for detecting and displaying an object hidden behind an obscuring surface, the hidden object having a dielectric constant, the method comprises disposing at the obscuring surface between an electrode and the obscuring surface a chamber of visual display material having a visual display characteristic that changes in response to the amount of energy applied to it by the electrode and in response to the dielectric constant of the hidden object, applying energy to the electrode and to the visual display material so that the visual display material becomes part of an electrical circuit that includes the obscuring surface and the hidden object, detecting the presence of the hidden object by the amount of energy applied to the visual display material and the dielectric constant of the hidden object, and displaying the shape of the hidden object by a change in the visual display characteristic of the visual display material resulting from the amount of energy applied to the visual display material and the dielectric constant of the hidden object, whereby the visual display material is used to both detect and display the hidden object.

In more detailed method aspects, the method of detecting and displaying further comprises controlling the application of energy to the electrode to expand or contract a depth of view of the electrode and the visual display material combination. The step of displaying comprises displaying the shape of the hidden object through the electrode. The method of detecting and displaying of claim 13 further comprising shielding the electrode from electric fringing effects that would otherwise occur at the periphery of the electrode. The method of detecting and displaying of claim 13 further comprising controlling frequency of the energy source to cause the visual display characteristic to flash the shape of the hidden object.

In other detailed method aspects, the step of disposing the chamber of visual display material comprises disposing a chamber of luminescent gas at the obscuring surface between the electrode and the obscuring surface. The method of detecting and displaying further comprises controlling a level of energy applied to the luminescent gas to maintain it substantially just at an ionization level at which the gas is glowing.

In yet further detailed aspects, there is provided a device for detecting and displaying a hidden object, the device comprising an energy source providing energy having a relatively high AC voltage, a substantially transparent electrode configured to receive the energy from the energy source, a chamber containing an inert luminescent gas that emits light in response to the amount of energy applied to it, the gas being placed between the electrode and the hidden object thereby providing an electrical circuit in which the luminescent gas forms a part, a controller circuit that controls the energy applied to the electrode to maintain the gas substantially just above an ionization level at which the gas glows, the controller also controlling the application of energy to the electrode to control an effective depth of view of the gas, wherein the gas detects the hidden object due to the change in capacitance provided by the hidden object in the circuit of which the gas is a part, and the gas displays the shape of the hidden object through the transparent electrode, whereby the luminescent gas both detects and displays the hidden object.

In yet further detailed aspects, the device for detecting and displaying further comprises a guard ring located about the electrode, the guard ring connected to the energy source to thereby shield the electrode from fringing effects, whereby electric fringing effects that would otherwise occur at the periphery of the electrode are prevented, and a ground ring located about the guard ring, thereby providing a return for the energy source. The controller circuit is further adapted to control a frequency of the energy applied to the electrode so that in the case where the hidden object comprises an electric field having a second frequency, the controller sets the electrode frequency relative to the second frequency of the field to result in the gas flashing the display of the shape of the electric field.

In an additional aspect, the device for detecting and displaying further comprises a movable conveyor belt, a mount disposed adjacent the belt at which the electrode and chamber are located so that the belt and items on the belt are disposed in an electrical circuit with the electrode and gas in the chamber, and a belt movement controller configured to move the belt and items on the belt over the electrode and chamber, wherein the device simultaneously detects and displays items on the conveyor belt.

In accordance with further aspects, there is provided a method for detecting and visually mapping relatively high frequency alternating current electric fields, comprising locating a chamber of visual display material having a visual display characteristic between an electrode and the electric field to be detected and mapped, the visual display characteristic configured to change in response to the amount of energy applied to it by the electrode and in response to the electric field to be detected and mapped, determining the frequency of the electric field to be detected and mapped, synchronizing a frequency of energy applied to the electrode with the frequency of the electric field to be detected and mapped, and applying an offset in the frequency of energy applied to the electrode from the electric field frequency, detecting the presence of the electric field to be detected and mapped by the amount of energy applied to the visual display material and the electric field detected, and visually mapping the detected electric field by a flashing change in the visual display characteristic of the visual display material resulting from the frequency and amount of energy applied to the visual display material and the frequency and energy of the detected electric field, whereby the visual display material is used to both detect and map the electric field.

In several additional aspects, in order to measure changes in capacitance and simultaneously display them as a visual map of behind-wall items, a planar or low profile chamber containing a low partial pressure of a luminescent gas or gasses is used. The chamber is sandwiched between the wall surface, and a nominally transparent planar electrode. A high frequency, high voltage AC source, is applied to the electrode and is adjusted either manually or automatically until the gas glows, or glows more brightly, as the instrument is passed over objects behind the wall surface. In this manner, as the detector is moved over the surface of the wall, the shapes of items behind the wall may be discerned. In another aspect, the shape of items behind an obscuring wall is displayed (a long thin area at a time) by the use of an elongated cylindrical container of luminescent gas, with an analogous narrow transparent activating electrode adjacent to one surface. In this case, the face of the cylinder, away from the wall, is covered with the transparent conductive electrode to allow the application of a high frequency, high voltage AC signal, to that surface. The other surface of the cylindrical gas chamber is placed against the wall to be probed. The voltage applied to the electrode is adjusted either manually or automatically until the gas glows, or glows more brightly, as the instrument is passed over objects behind the wall surface. By sweeping the wand-like device over the surface of the wall, a map of the under-surface structures can be visualized a line at a time.

These and other aspects, features, and advantages of the present invention will become apparent from the following detailed description of the preferred embodiments which, taken in conjunction with the accompanying drawings, illustrate by way of example the principles of the invention.

DETAILED DESCRIPTION OF THE PREFERRED EMBODIMENTS

Figure 1:
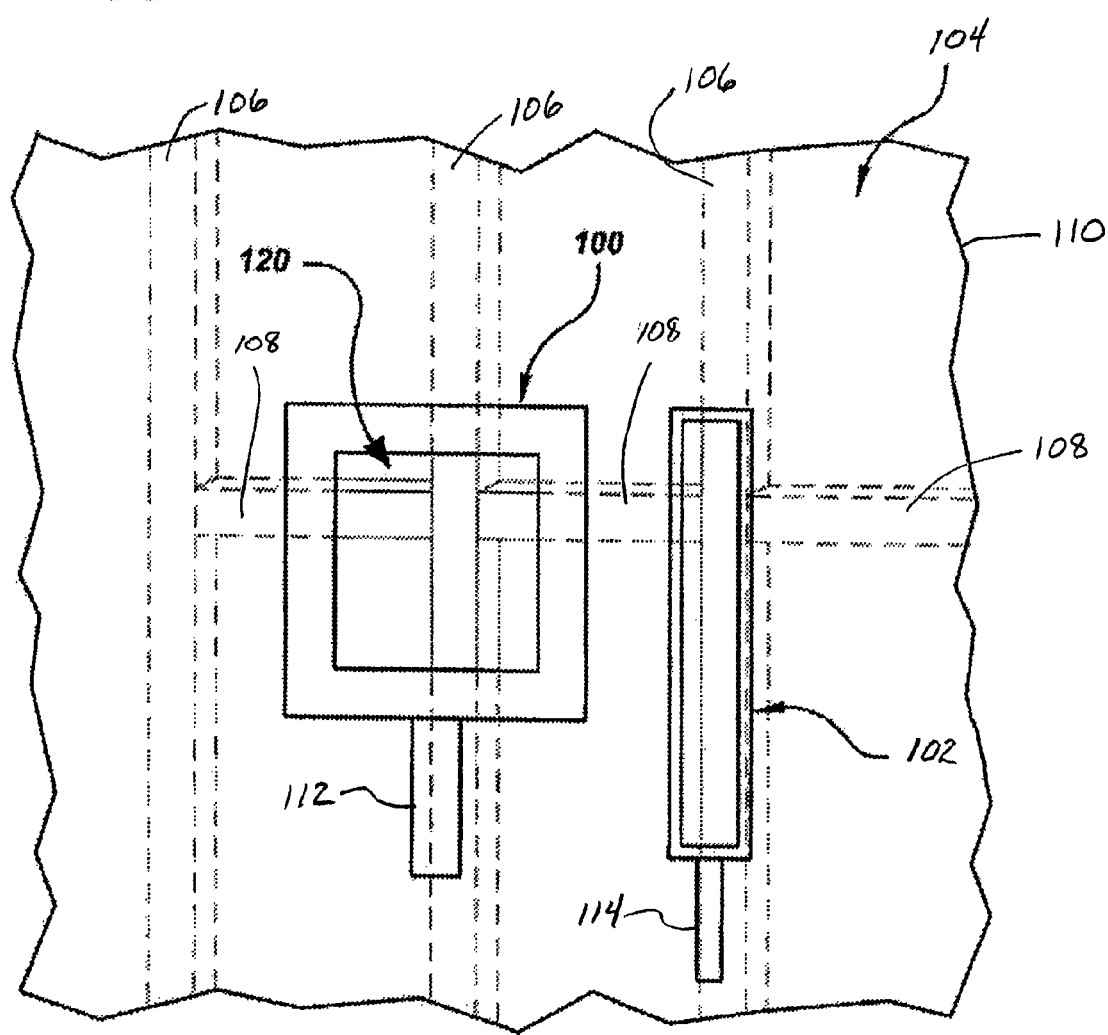
FIG. 1 illustrates a planar and a linear embodiment of a device that provides the detection and display of hidden objects located behind an obscuring surface, in this case showing that the planar device is capable of providing more information in the display than the linear device.

Referring now to the drawings in more detail, in which like reference numerals refer to like or corresponding elements among the several views, there is shown in FIG. 1 two detector devices 100 and 102, both of which are configured and operate in accordance with aspects of the invention. Both are located over a surface 104 that is obscuring the existence of objects (shown in dashed lines) located on the other side of the surface. In this example, the objects comprise three vertical studs 106 and three horizontal cross braces 108. The detector devices 100 and 102, sometimes referred to as scanners, are being used to scan the surface 104 of a wall 110 to reveal structures 120, lying below or behind the surface.

The first detector 100 is square in this embodiment and provides a larger view of the objects 106 and 108 that are obscured from view by the wall 110. This first detector includes a handle 112 for ease in use. The second detector 102 is more in the shape of a wand having more of an elongated shape with one dimension being much longer than the other. This second detector also comprises a handle 114 for ease of use.

Figure 2:
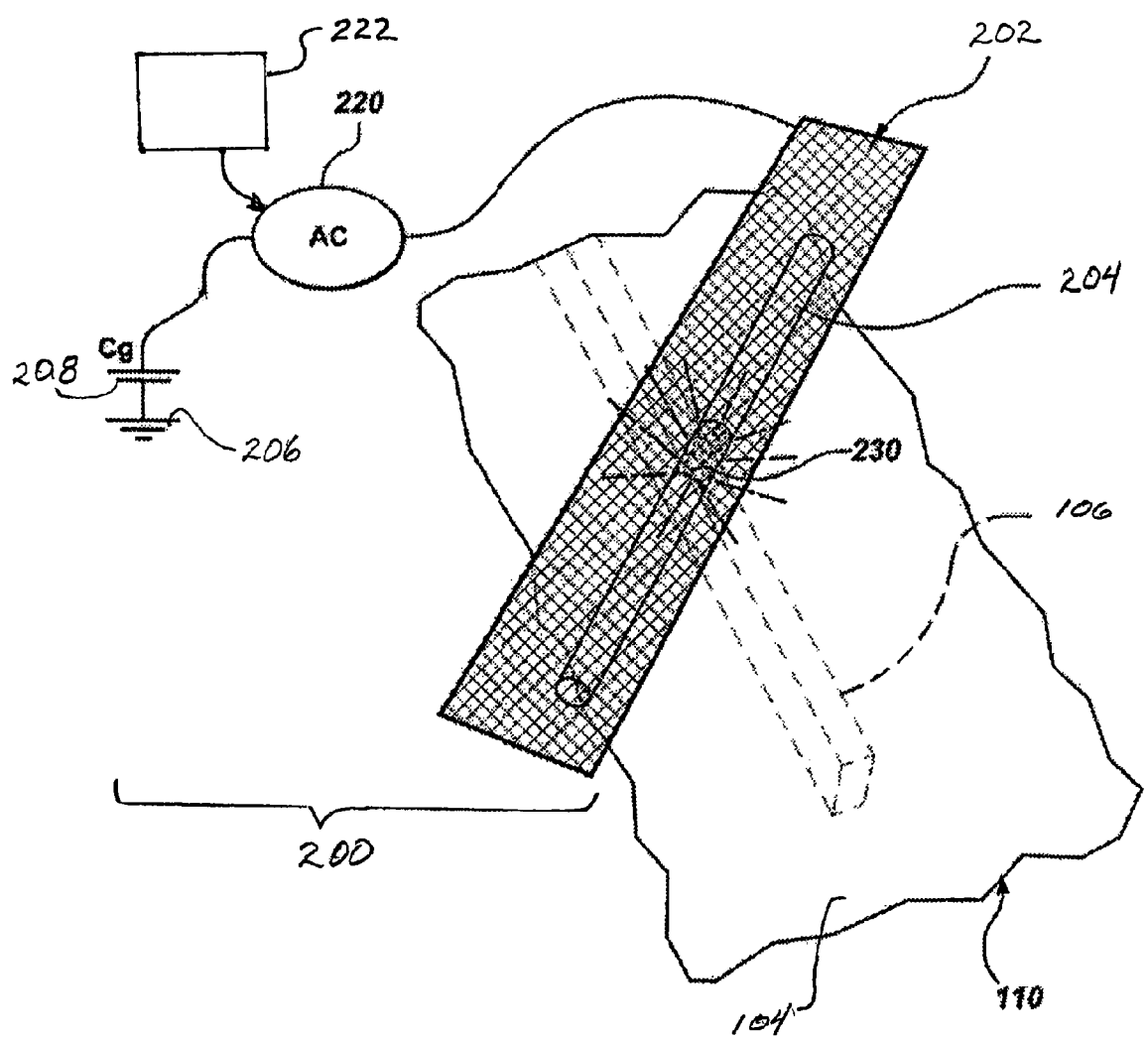
FIG. 2 presents a schematic view of the use of a chamber containing luminescent gas disposed between a transparent electrode screen and the hidden object within a wall surface, an AC energy source being connected with the electrode to control the ionization of the gas in the chamber to detect and display the hidden object.

Referring now to FIG. 2, a first embodiment (linear) of a detector device 200 in accordance with aspects of the invention is shown. This detector device resembles the "wand" or elongated type of detector 102 shown in FIG. 1 in that one dimension is much longer than the other. In this embodiment, the detector employs a rectangular, transparent, conductive electrode 202 which is mounted above a transparent cylindrical gas tube 204. The electrode 202 is substantially transparent. A wire mesh material or an indium-tin oxide coated glass sheet are suitable for the application. In one embodiment, the electrode comprised electrically conductive window-screen type material.

The transparent gas tube 204 contains a luminescent gas under low pressure. The noble gasses such as neon, argon, and krypton (or mixtures of them with other gasses) are suitable for the application.

A source of high frequency, high voltage alternating current 220 is applied to the electrode 204. This voltage is applied with respect to ground 206 in this case. When the inventive detector device 200 derives its power from a mains supply, this ground may be obtained via direct connection to the ground lead of its three conductor power cable, or a capacitive connection 208 to ground can be obtained through the use of a small-valued capacitor Cg (100 pf or so) connected between the ground side of the high voltage AC supply 220 and the ground lead of the three conductor power cable (not shown in the figure). Even in cases where the detector device is battery powered, a "dummy" three terminal power plug, with connection only to the ground pin, can be employed, and a wire brought from this ground pin into the detector device to supply the described ground.

In another embodiment, the detector 200 can be battery-powered, handheld, and without an umbilical cord, and in that case, the capacitance of the user to ground, and to areas of the circuitry, even through an (ideally plastic) electrically insulating mounting case, will be sufficient to provide a return path for currents to flow through the gas 204. A handle and case (not shown in this view) are provided to allow the AC source 220, electrode 202, and the gas tube 204, to be held up to the wall 110 and scanned over its obscuring surface 104 as a combined unit. In operation, as the handheld detector device 200 of FIG. 2 is scanned over a wall surface 104, the gas inside the tube 204 will glow at the locations where there is an object or a portion of an object. As shown in FIG. 2 in this case, the gas tube 204 is glowing 230 over the wall stud 106 obscured by the surface 104 of the wall 110. By increasing the voltage or the frequency of the power source 220 through a controller 222, thereby increasing the capacitive current flow applied to the electrode 204, the depth of surface penetration of the detector device can be controlled. For example, while wall studs may be in contact with the inner surface of a wallboard, wiring or pipes may be farther away from the outer surface 104 and inner surface of a wallboard. Increasing the capacitive current flow to the electrode will enable its detection range to extend farther into the obscured volume behind the wall 110.

Figure 3A:
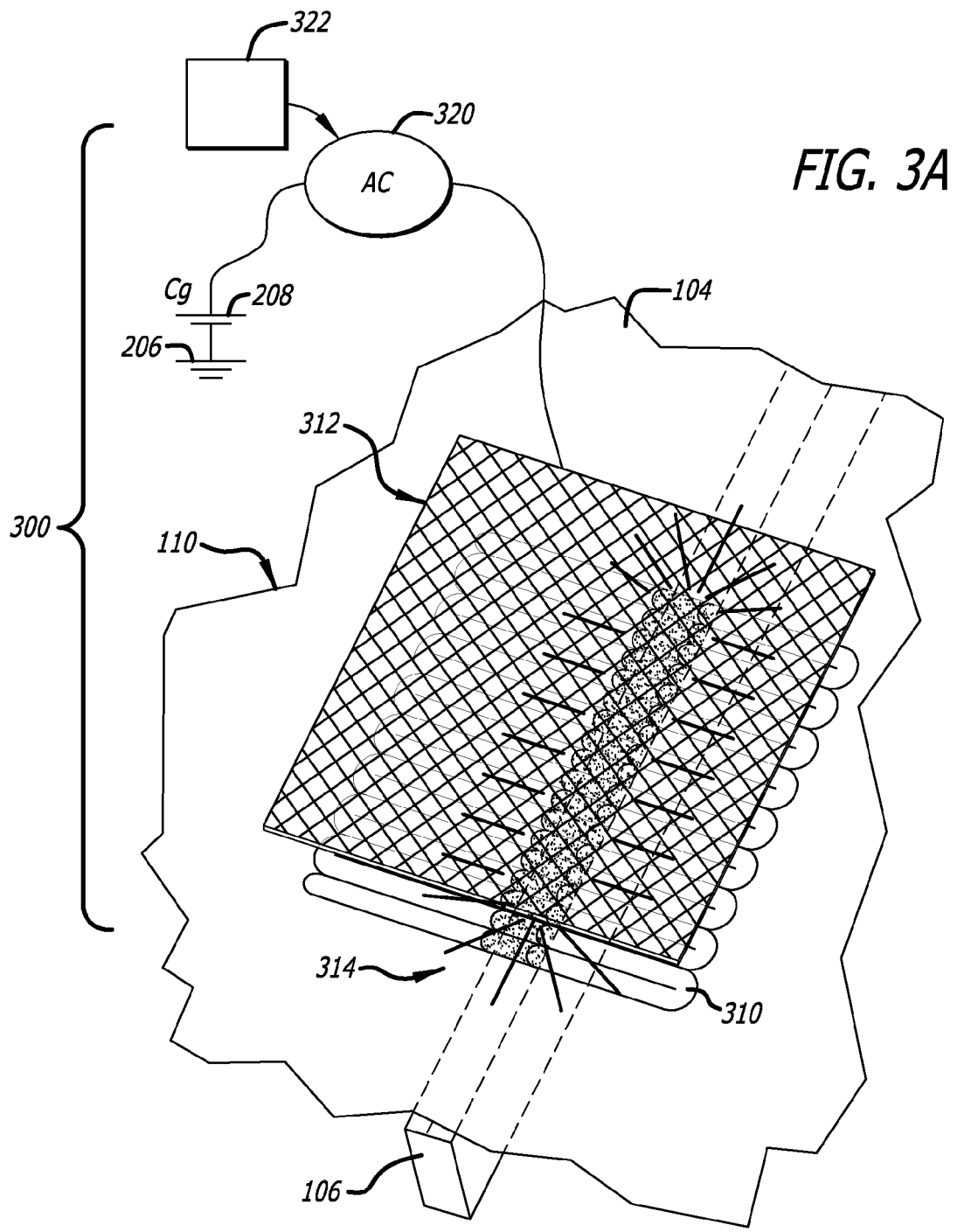
FIG. 3A is a schematic view similar to FIG. 2 but in this embodiment, a serpentine shaped chamber of luminescent is used which will provide a greater surface area under the obscuring surface for viewing, with a single transparent electrode screen used to control the energy applied to the gas.

In another embodiment depicted in schematic form in FIG. 3A, a different configuration of a detector device 300 is shown. Instead of the single linear strip of instantaneous detection capability shown in FIG. 2, FIG. 3A provides a detector device and method capable of examining large, twodimensional areas of wall surface 104. The detection device 300 illustrated in FIG. 3A comprises a serpentine gas tube 310 which in this embodiment is ideally a clear, sealed, neon tube similar to commercial neon lighting tubes, but without end electrodes, a planar, electrically-conductive and optically transparent electrode sheet material 312, which is mounted directly above (with respect to the obscuring wall surface 104 and the gas tube 310), and a high frequency AC voltage source 320 which is connected to the electrode sheet 312.

In accordance with the embodiment of FIG. 3A, the user views the serpentine gas tube 310, and the wall surface 104, through the transparent electrode sheet 312. The novel detector device 300 can also be outfitted with a non-conductive housing and a handle (not shown) to hold the assembly in alignment as a unit. The gas in the tube 310 will illuminate in areas 314 where it is over objects such as a stud 106 behind the wall 110.

Figure 3B:
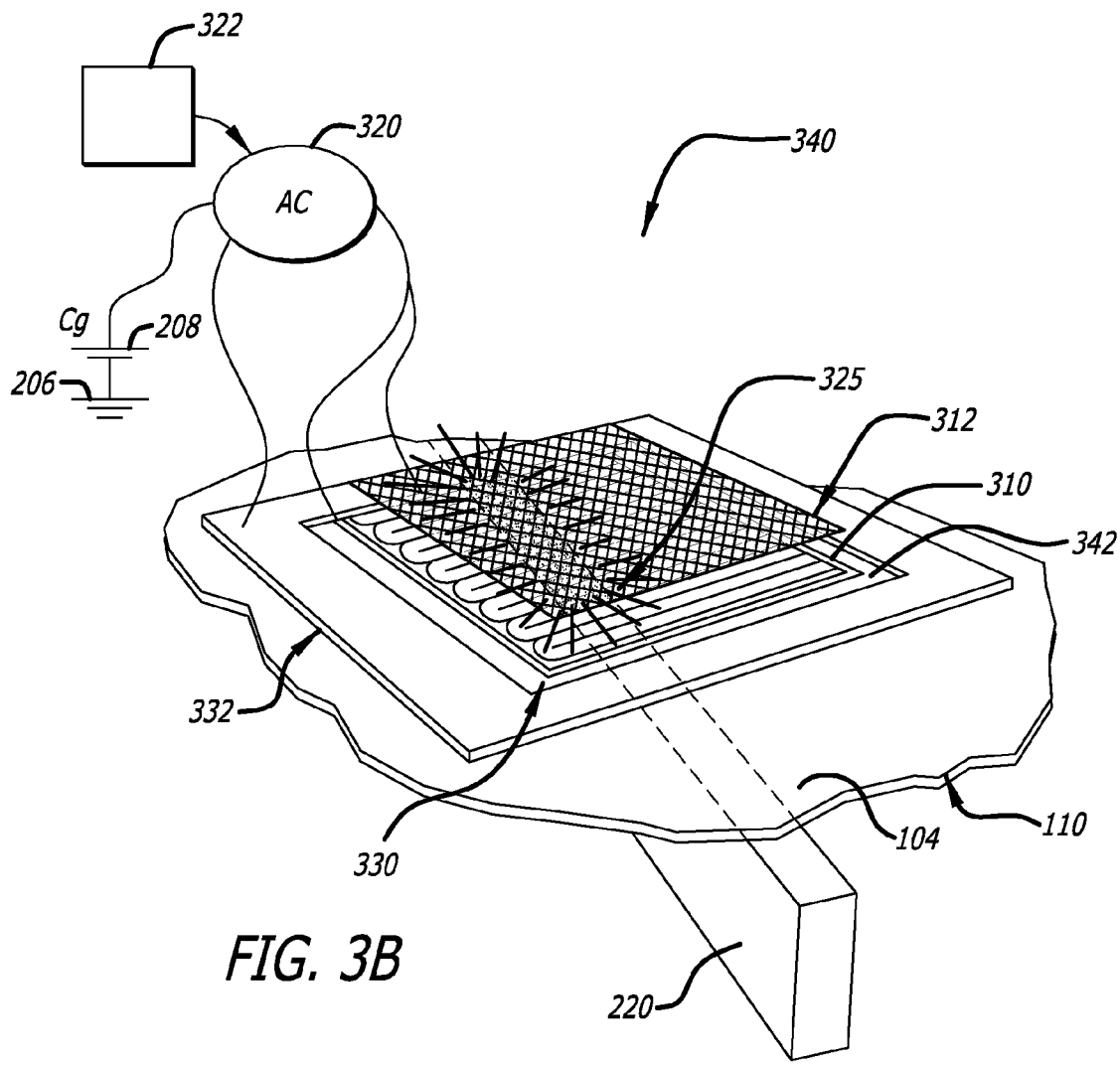
FIG. 3B is a variation of the embodiment of FIG. 3A in which a guard ring is disposed about the electrode to control fringing effects of the electrode that ionizes the gas in the chamber, and a ground ring is disposed about the guard ring to provide a return for the energy source at the site of the device.

Yet another embodiment is shown in FIG. 3B where the use of an in-plane guard ring 330, and an in-plane ground ring 332 is shown as part of the detector device 340. Here, a rectangular transparent substrate 342 (a transparent acrylic sheet would be suitable) provides a base for the detector device 340. A serpentine gas tube 310 sits atop this substrate with an electrode 312 above that. As in FIG. 3A, the electrode in this case comprises an optically transparent electrode sheet material 312. Surrounding the electrode is the ground ring 332 and positioned between the ground ring and the electrode 312 is the guard ring 330, which encircles the electrode and tube.

When the detector device 340 is placed against the wall surface 104, the ground ring 332 forms a capacitive connection to the wall surface 104, and thus provides a return for ground currents for the AC supply 320. Thus, the ground ring's 307 capacitance to ground can augment, or replace the capacitance to ground of the user.

The guard ring 330 that surrounds the serpentine tube 315 is placed in closer proximity to its edges. This guard ring may be connected to the same lead of the high voltage source 320 that is used to drive the top electrode 312 of the detector device. This guard ring prevents electric fringing effects that would otherwise occur at the periphery of the gas tube electrode 312 to thereby shield the electrode. These fringing effects would tend to cause the field across the peripheral areas of gas tube 310 to be illuminated before portions located closer to the center were illuminated.

Figure 4:
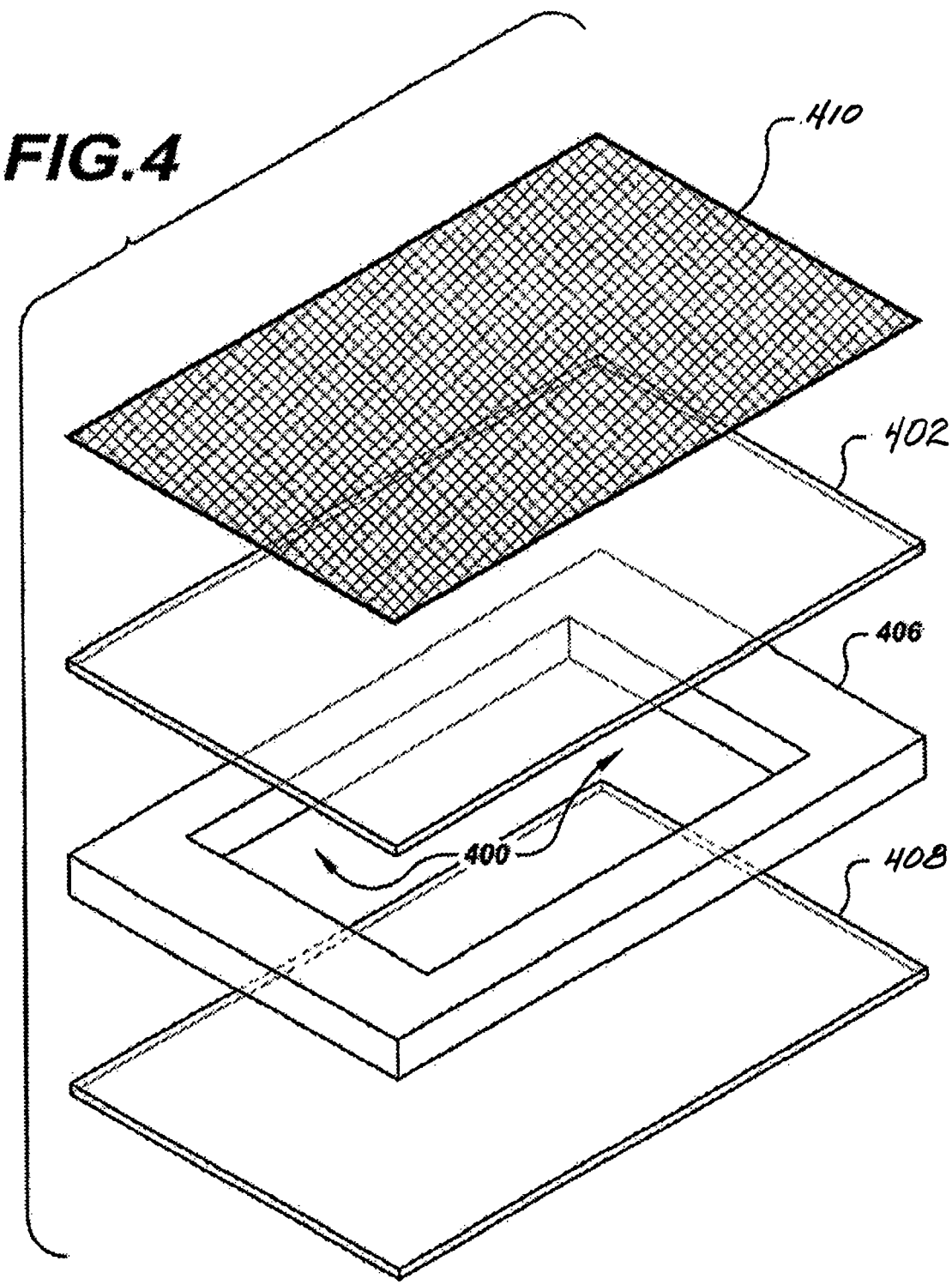
FIG. 4 shows the manufacture of a rectangular chamber with a built-in transparent electrode, the luminescent gas being disposed within the frame and the transparent layers.

In a further embodiment as shown in an exploded form in FIG. 4, a rectangular evacuated chamber 400 is formed by means of the combination of a top optically transparent layer 402, an open rectangular frame 406, and a bottom optically transparent layer 408. The layers are hermetically bonded together and the chamber 400 formed thereby is filled with a luminescent gas. A top, transparent, conductive electrode 410 is placed over the entire unit. This electrode may be a plated-on transparent coating applied to the top optically transparent layer 402 to form the detector device 420. A non-conductive case and handle (not shown) are provided for easy use in sliding the detector over a desired probe area. As in other embodiments, the detector device of FIG. 4 places a luminescent gas between an electrode and an area to be scanned with the gas forming a part of the detector circuit as well as simultaneously providing a visual display. The gas forms part of the capacitance link between the electrode and the ground and is thus directly affected by the capacitance of the obscuring surface and the hidden objects behind that obscuring surface since the electrical energy through the gas is a direct result of that capacitance.

It has been noticed during the course of developing the invention, that once an area of gas ionization occurs, the area tends to bloom past the location causing the initial ionization. In each of the inventive embodiments above, while it is desirable to have the device be as sensitive to under-surface objects as possible, it is also critical to limit the size of the glowing area so that it corresponds as closely as possible to the size and shape of the obscured object that is detected. To achieve this goal, it is important that the voltage applied across the luminescent gas in the evacuated chamber be adjusted to a point just supporting gas ionization; i.e., at ionization potential but not significantly higher. Then, even the slightest increase in capacitance in areas adjacent the detector device (causing the highest local AC potentials across sections of the gas) will ionize the gas directly above the detected object. In order to achieve this, the voltage, and ultimately current, delivered to the gas-filled chamber must be detected and regulated to keep the gas at this threshold point.

In each of the embodiments discussed below and shown in the figures, significant increases in high-voltage AC current occur as the electrode voltage increases and the gas begins to ionize, thus this current may be used in a feedback loop to control either the voltage, or frequency of the high-voltage such that the image achieved with the system is a true representation of the below-surface items. The high-voltage electrode current itself may be measured (for instance by using a small series resistor and sensing the current flow in it), or conveniently, since the high voltage will often be derived from a lower voltage supply voltage, by measuring the current being delivered by this lower voltage supply.

Figure 5:
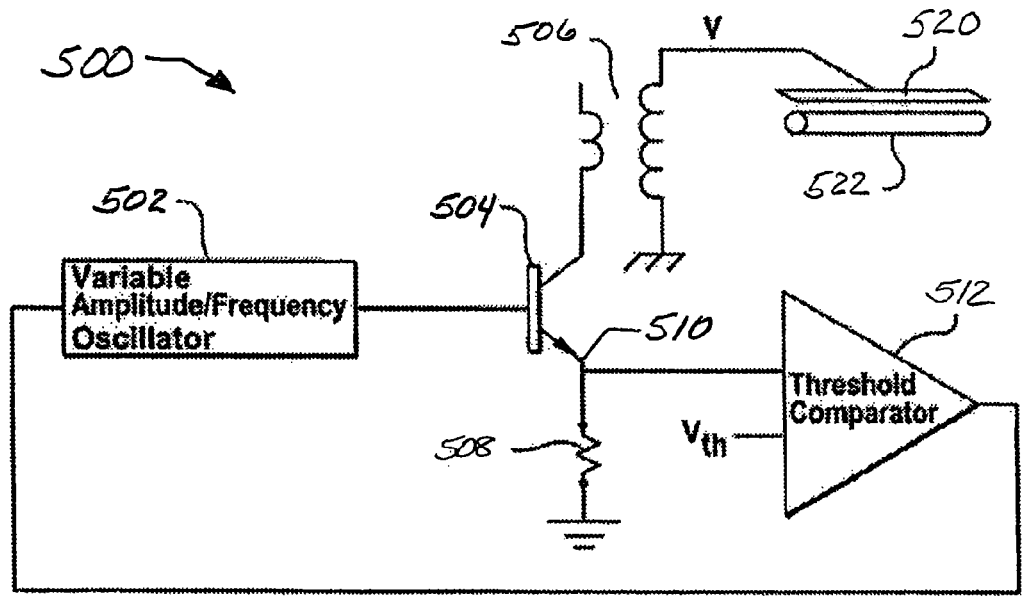
FIG. 5 presents an electrical diagram of the operation of control over the energy level of the luminescent gas in the chamber with the emitter of the semi-conductor device being monitored for current flow to thereby control the oscillator accordingly to keep the gas just at the ionization level so that it continuously glows.

FIG. 5 depicts this technique. Here, a power control circuit 500 includes a low voltage variable amplitude oscillator 502 that drives an output transistor 504. The transistor 504 in turn drives a step-up transformer 506. The transformer 506 will be of the high-turns-ratio type useful for generating high AC voltages. The output of the transformer is used to provide power to the top electrode 520 above the gas tube 522. The instantaneous drive currents of the transistor 504 are monitored through the use of a current sense resistor 508 in its emitter lead 510, and compared to a (adjustable or fixed) threshold $V_{th}$ via a comparator/feedback amplifier 512. Increases in drive current are used as negative feedback and regulate the variable amplitude oscillator 502 so that the overall amplitude of the high voltage signal "V" applied to the transparent electrode 520 may be kept just above the ionization threshold of the gas chambers 522 in each of the above-described detection embodiments.

In a related manner, the oscillator 502 may be used in a constant amplitude variable frequency mode. In this case, the feedback loop regulates the frequency of the oscillator. Since higher frequencies cause more current through a fixed capacitance, the loop 500 lowers the frequency when the gas begins to ionize and raises it when the gas is below its ionization point. It should be noted that pulse width modulation control may also be used to keep the gas just on the edge of conduction in each of the regulating means.

Figure 6:
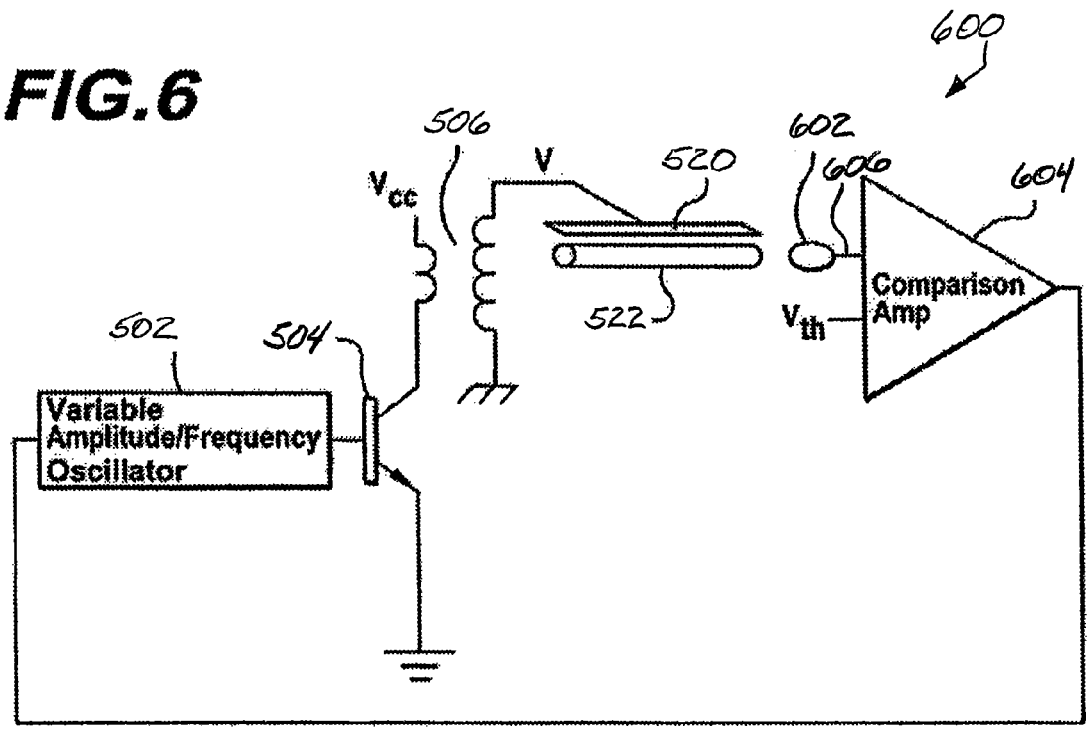
FIG. 6 is another embodiment of control over the ionization of the luminescent gas in this case by using a photodetector to actually measure light output of the gas, compare it to a predetermined threshold level voltage and to control the oscillator to keep the gas just at the ionization level.

An alternate method of keeping the gas in the chamber just at the point of ionization is to monitor the light generated by the gas as it just begins to ionize. To achieve this goal, the circuit 600 of FIG. 6 may be employed. In this circuit, the low voltage variable amplitude oscillator 502 drives the output transistor 504. The transistor 504 in turn drives the step-up transformer 506 and generates the high voltage AC signal V ultimately applied across the luminescent gas in the chamber 522. An optical detector 602 detects light emitted by the gas 522. The optical detector 602 is illustratively a photocell sensitive to the wavelength of light emitted by the luminescent gas, although several other devices may be used to detect this light including photodiodes, phototransistors, and others.

A comparison amplifier 604, with an adjustable threshold voltage "$V_{th}$" provides the feedback mechanism. In operation, when the overall device 600 is turned on, the AC voltage level V at the electrode 520 ramps up since there is no light coming from the gas tube 522. At some point, V will reach the ionization point of the gas (at the location where this ionization point is the lowest) and the gas will start to glow. When the first glow occurs, the photo-detector 602 detects this light and applies its signal 606 to the threshold comparator 604. As the amount by which this signal 606 exceeds the threshold $V_{th}$ increases, the voltage at the output of the comparator 604 causes the amplitude or frequency of the variable amplitude oscillator 502 to decrease. This negative feedback curtails the current caused by V at the electrode 520. As a result of this feedback process, the gas-filled tube reaches a low steady state glow level and is set for maximum sensitivity. As the detector device is placed against a wall to be probed, the system will constantly adjust itself so that only items with a relatively larger capacitance to ground cause specific parts of the gas in the chamber 522 to glow.

Figure 7:
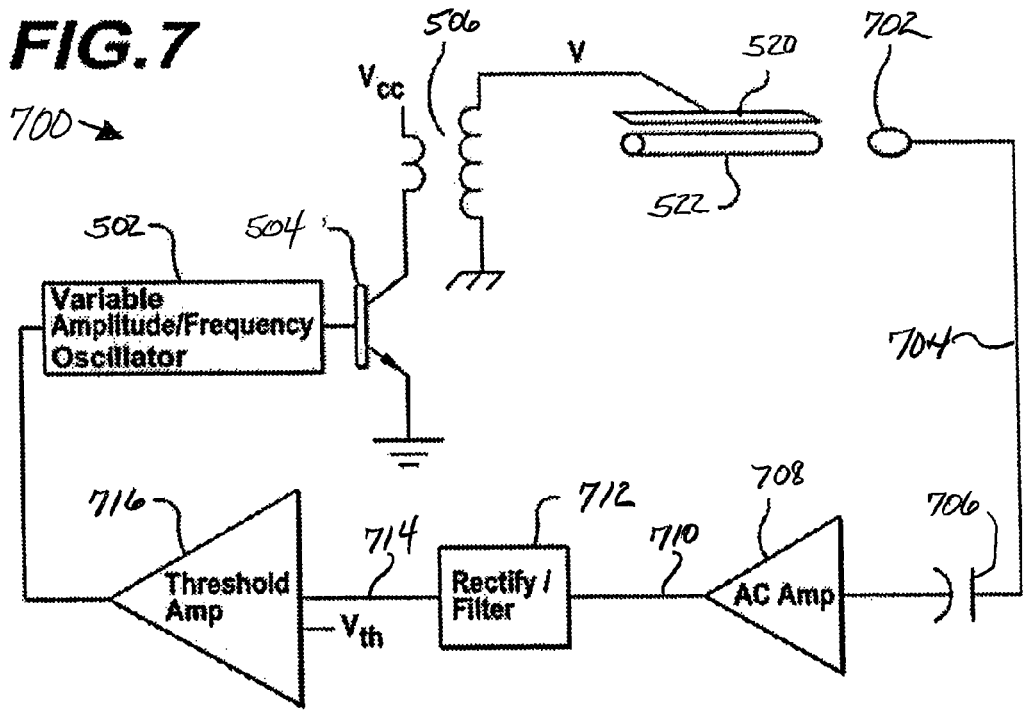
FIG. 7 provides yet a further view of a circuit used to control the light output of the luminescent gas in the case where ambient light may adversely affect the circuit of FIG. 6. In this circuit, the light output of the luminescent gas is sensed, any DC component in the resulting signal is blocked, and the resulting signal is amplified, filtered and rectified; and again compared with a threshold level voltage to control the oscillator to keep the gas just at the ionization level.

In cases where outside, extraneous, or ambient light might interfere with the sensing of light in the gas-filled chamber 522, the circuit 700 exemplified by FIG. 7 can be used. Analogous components of this circuit are as described earlier. Here, the AC component of light coming from the tube 522 is detected by a high frequency capable photo-sensor 702. This signal 704 is received by a DC blocking capacitor 706 and then amplified by an AC coupled high frequency amplifier 708. The amplified signal 710 is then applied to a rectifier/filter 712. The frequency response of the amplifier 708 is set so that the multi-kHz frequencies of the light emitted by the gas chamber 522 is passed, but not ambient light from, for instance, fluorescent bulbs which will be predominately at much lower frequencies. The rectified and filtered output signal 714 is applied to a threshold amplifier 716. The threshold voltage $V_{th}$ of the threshold amplifier 716 is adjusted so that the output of the threshold amplifier 716 keeps the high voltage signal "V" at a level insuring greatest contrast and sensitivity for the overall detector device.

Figure 8:
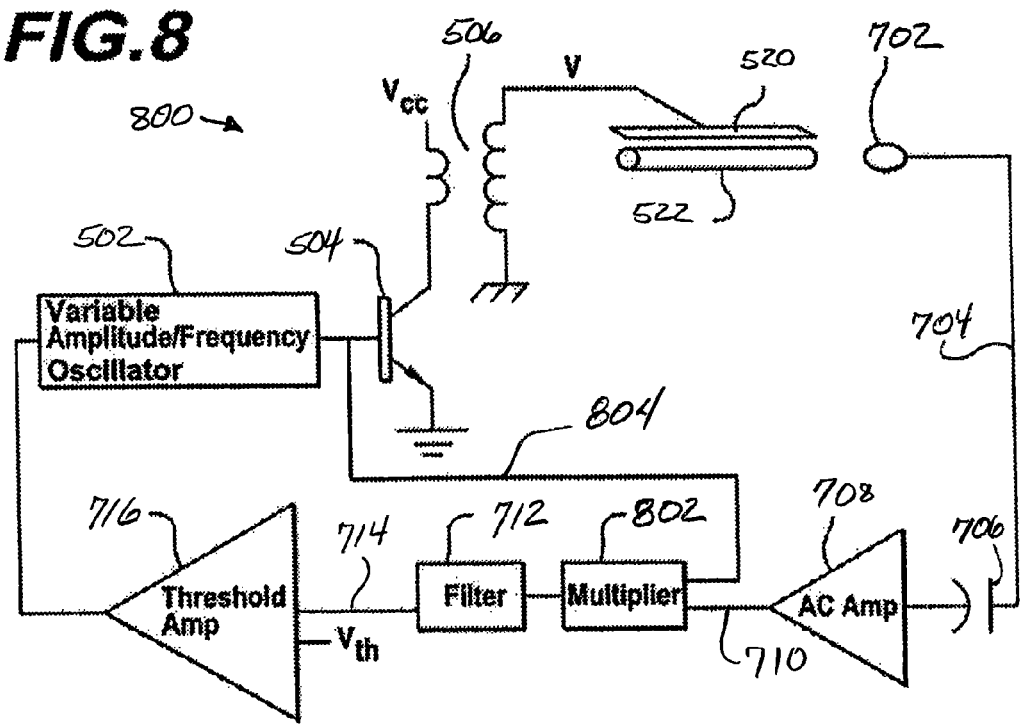
FIG. 8 provides a circuit that may be used in the case where outside light would interfere with the ability to measure the illumination provided by the luminescent gas, in which the output of the oscillator and the output of the luminescent gas sensor are multiplied together to result in a DC term that is used to control the ionization of the gas.

Similar to the previous embodiment shown in FIG. 7, in cases where outside light would tend to interfere with the device's ability to discern the level of light being generated by the gas chamber, detection of the AC portion of the light is employed. In order to have even greater immunity to outside ambient light, a synchronous detection technique may be used. In the case of FIG. 8, the circuit 800 uses an oscillator 502 not only to drive the high-voltage circuitry for producing the HVAC signal, but its output 804 is also applied to a multiplier circuit 802. The oscillator signal 804 is multiplied by the AC amplified signal 710 coming from the photo-detector 702. As is known in the art, if two signals having the same phase and frequency are multiplied, the resultant will contain a DC term representative of the amplitude of the input AC signal. This filtered DC term is applied to a comparator amplifier circuit 716 and provides an interference free feedback signal for the oscillator 502.

Figure 9:
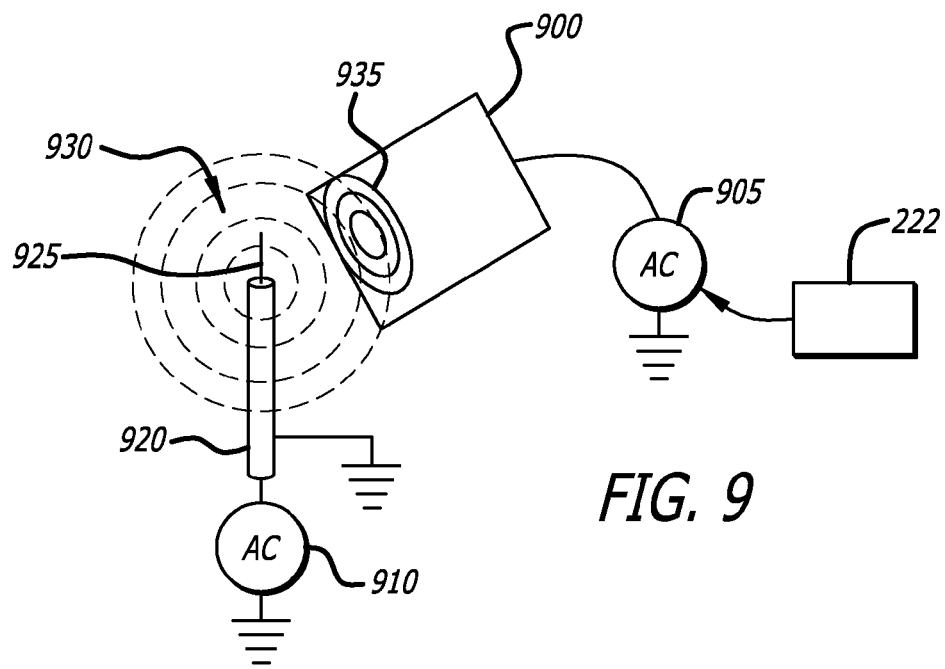
FIG. 9 provides a view of a gas ionization detector device in accordance with aspects of the invention in which the existence of an electromagnetic radiation source is detected and mapped.

FIG. 9 illustrates an embodiment of an inventive detection device 900 being used to detect the presence and strength of electromagnetic fields. A source of AC voltage 910 is connected through shielded wire 920 to a point emitter 925. The point emitter 925 radiates a varying electric field with equipotential lines 930. The detection device 900 is brought near the emanating field and the field is detected as a gray scale area image 935 where higher potentials glow more or less brightly than areas of lesser potential. If the AC power source 905 providing excitation for the detection device 900 is adjusted to be a few Hertz displaced or "offset" from the frequency of the AC source 910 of the point emitter 925, a beat frequency will be set up such that the image viewed on the detector device 900 will flash or blink at the beat frequency since the two fields will alternately augment or diminish the voltage across the gas in the detector device 900.

The use of the detector device 900 in this manner is helpful for the purpose, for example, of determining the point of origin of stray electric fields. Since stray fields in electronic equipment can cause interference, crosstalk, and general malfunction, the detection 900 in accordance with the invention can be used to locate these fields, and having located them, visually evaluate the effect of various approaches to mitigate them.

Figure 10:
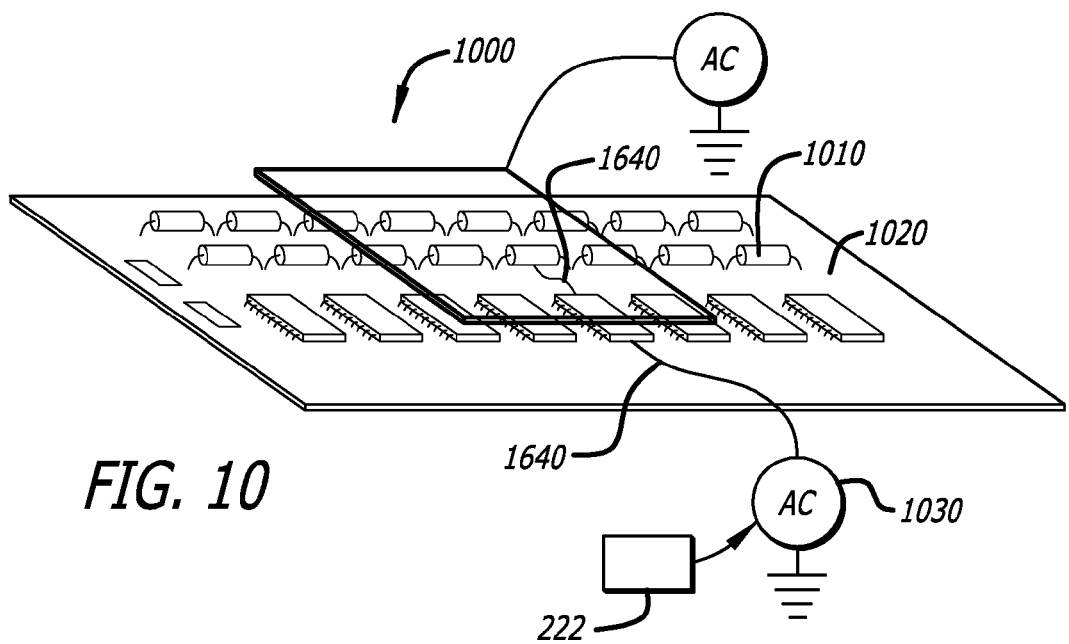
FIG. 10 shows the use of a gas ionization detector device configured in accordance with the invention to detect electrical connections between components on an integrated circuit board.

FIG. 10 shows the use of a detector device 1000 in accordance with aspects of the invention, to inspect the connectivity of, for instance, electronic components 1010 on a circuit board 1020. Those components that are connected to an AC source 1030 via intact paths 1040 on the circuit board will cause a flashing pattern on the screen of the detector device 1000. Indeed, different frequencies can be used to provide different flashing patterns for different paths on circuit boards. Thus, large areas of electronic devices can be scanned quickly and efficiently in broad swathes for connectivity of individual components, or for unintended short circuits between components.

Such detection of intact paths is useful, for example, to verify whether circuit boards have been manufactured properly, or to trace the location of breaks in connectivity in order to repair a circuit board which is functioning incorrectly. Additionally, the use of flashing displays as discussed above, can be extremely helpful in low sight situations or in situations with the shade of one object on the screen is only slightly different from another object.

The above-described detection devices use evacuated chambers filled with luminescent gases that emit light when an appropriately high voltage electric field is impressed across them. The luminescent gas chambers are brought into close proximity with a wall surface. One terminal of a high voltage, low current capability, alternating current voltage supply is applied via a transparent electrode (wire mesh often suffices) to the side of the luminescent gas chamber away from the wall surface. The other terminal of the relatively high AC voltage is applied either directly to ground, or is capacitively coupled through the user's body to ground, or may have a path to ground through a ground ring surrounding the chamber and transparent electrode. The AC voltage is adjusted (such as by the automatic circuits of the embodiments described above) until the luminescent gas or gases are just at the point of ionization (glowing). At this point, areas where there are objects below the obscuring surface (such as wall studs, electrical boxes, wiring, HVAC components, water pipes, air conditioning, heat ducts, etc.) will have a higher capacitance to earth ground, and therefore will provide a lower AC impedance to the AC voltage applied to the gas chamber and will glow, or glow more brightly, than surrounding areas. The gas in the chamber is preferably homogeneous which results in each molecule or atom of the gas, as the case may be, functioning as a detector. By this means, a highly defined, high resolution, high contrast view of the hidden objects will be provided to the user.

The use of a continuous and homogeneous gas within the chamber 522 (FIG. 5) results in a much higher resolution of detection than with the prior art use of discrete capacitive elements. Since the gas is used to form part of a capacitive sensor, it is directly responsive to the capacitance changes brought about by being placed adjacent a hidden object behind a wall, for example. The parts of the gas located adjacent a hidden object that would increase the current through the gas due to the increase in capacitance provided by that hidden object will be detected by that part of the gas. The discrete elements so often used in the prior art are not used here. Reaction of the continuous gas to capacitance changes occurs at an atomic or molecular level yielding extremely high resolution. Additionally, the method of bringing the gas just to its ionization level where the gas becomes optically visible also provides the display function of the detection device. Using the gas simultaneously both as the detecting component and the display component of the detection device in accordance with aspects of the invention results in fewer parts and reduced expense. Additionally, it effectively provides a window that shows the environment behind the obscuring surface.

Although described above for use with a few applications, it should be noted that a detection device in accordance with the invention may be usable with numerous applications. As examples of some other uses, such a detector would be useful in determining construction issues in airplanes/boats with non-conductive hulls. Such a detector may also be useful in locating explosives that are hidden in walls or behind other obscuring surfaces. It can also be used to determine whether a person is wearing a false leg or other body part. A person hiding on the other side of a wall surface, someone behind a door, or someone hiding inside a boat or other vessel can also be "seen."

Further applications include analyzing composite sheet materials to locate thickness or seam inconsistencies, analyzing fiberglass boat hulls to locate seams, locating materials underwater (different density of water vs. other materials), locating contraband on a person, locating where things are not (e.g. determining that something is solid), determining where "blind" holes in large fiberglass structures need to be (e.g. a person gets inside a large plastic pipe, and can find areas outside the pipe that are locations where fasteners need to go through).

Yet other applications include determining the fit of shoes since human tissue will show up against the less "wet" (conductive), leather or rubber, finding high frequency electric fields (tuning the phase of the electrostatic exciting field for the gas), detecting in a wiring harness a particular wire and whether it is broken, determining when something metallic is more, or less, connected to ground, locating anything conductive that has a reasonable capacitance to ground, finding conductive particles in non-conductive backgrounds, detecting the shape of the residue of a conductive liquid as it evaporates (for instance a solution of lightly salted water leaving behind a conductive layer of brine).

Additional applications include detecting and tracking a guide wire behind a wall/floor surface (to steer a vehicle autonomously), determining in medical applications where someone is on a non-metallic gurney from underneath without requiring invasive radiation, seeing how well a cast fits a patient. Further applications include detecting whether, and where, water is in a plastic pipe, detecting the flow of water or other liquids in plastic, or other non-conductive pipes, detecting the exact "shape" of water in a container from the bottom, for instance, being able to detect water in a shallow plastic "pan," being able to see the flow of a conductive gas, or a conductive liquid dissolved in a non-conductive fluid, or to discern liquids with different dielectric constants, looking through fabrics during manufacture to see indexing "marks" (possible to make these marks, or hidden images, of flexible conductors), looking through large sheets of plywood to determine when they are lining up with machines that are about to cut or shape them in other ways, detecting a path on a printed circuit board and when that path is broken, finding the low spot in a container by looking at the pattern of water collecting in the (nominally) flat-bottom container, looking to see whether plated-on conductive coatings on plastics are effective, finding conductive ores in non-conductive slurries.

Further applications include looking through clothing to see what the fit is on someone wearing them (what part of the area underneath the clothing is "air" and what part is "flesh"), detecting a metallic pattern that can be painted onto a surface; "find the hidden message," detecting hidden patterns in thread in fabrics (could be used for sending secret messages), or as a novelty device to see hidden messages in fabrics, displaying a pattern made up of simple wire behind a fabric, detecting hidden messages for games, real-time painting with conductive ink, and being able to see the image that you painted in neon light, painting in conductive ink (or perhaps somewhat conductive water, or just water), and doing it over one of the detectors configured in accordance with the present invention, such that the UV that is emitted causes phosphor to glow, thus giving real time painting on phosphors with just water. And finally, the invention may be used to provide a system that allows a device to self-level when it looks at the pattern of a conductive liquid in a vessel.

Although described and shown in terms of using a luminescent gas, other materials having visual display characteristics that vary in response to electrical energy or fields or other energy impressed upon them may be used. Liquid crystal material, electro-chromic devices sometimes known as "smart glass," and other materials may be usable. These materials may produce their own light, such as luminescent materials, or may be assisted by the provision of other light sources. They may be front lit or backlit, depending on the particular application for the invention.

The embodiments described and shown herein are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

What is claimed is:

1. A device for detecting and displaying an object hidden behind an obscuring surface, the hidden object having a dielectric constant, the detecting and displaying device comprising:
    an energy source;
    an electrode connected to the energy source;
    a chamber disposed between the electrode and the obscuring surface, comprising:
        a visual display material disposed in the chamber between the electrode and the hidden object, the visual display material having a visual display characteristic that is varied in response to the amount of energy applied to it by the electrode and in response to the dielectric constant of the hidden object; and
        a display area through which the visual display characteristic of the visual display material can be seen;
    wherein a change in capacitance caused by the hidden object is detected by the visual display material and the shape of the hidden object is displayed in the display area of the chamber by the varying of the visual display characteristic of the display material;
    whereby the visual display material is used to both detect and display the hidden object.

2. The device for detecting and displaying of claim 1 further comprising a controller circuit configured to control the application of energy to the electrode from the energy source to expand or contract a depth of view of the electrode and the visual display material combination.

3. The device for detecting and displaying of claim 1 wherein the electrode comprises the transparent area through which the visual display characteristic of the visual display material can be seen.

4. The device for detecting and displaying of claim 1 further comprising:
a guard ring located about the electrode, the guard ring connected to the energy source wherein the guard ring shields the electrode;
whereby electric fringing effects that would otherwise occur at the periphery of the electrode are inhibited.

5. The device for detecting and displaying of claim 1 wherein frequency of the energy source is controlled to cause the visual display characteristic to flash the shape of the hidden object.

6. The device for detecting and displaying of claim 1 wherein the visual display material comprises a luminescent gas.

7. The device for detecting and displaying of claim 6 wherein the luminescent gas comprises an inert gas.

8. The device for detecting and displaying of claim 6 further comprising a controller circuit that controls the energy applied to the gas to maintain the gas substantially near an ionization level at which the gas is just ionized to result in a glow of the gas.

9. The device for detecting and displaying of claim 8 wherein the controller circuit comprises a photo-detector that monitors the amount of light emitted by the gas and controls the energy applied to the gas so that the detected light remains just at the glowing stage.

10. The device for detecting and displaying of claim 8 wherein the controller circuit comprises a photo-detector configured to detect light emitted by the gas but not detect ambient light.

11. The device for detecting and displaying of claim 10 wherein the controller circuit performs a synchronous detection of the emitted light from the luminescent gas, the controller circuit comprising a photo-detector that detects the light emitted by the luminescent gas and provides a detection signal;
wherein the energy source produces an electrode signal to drive the electrode; and
the controller circuit further comprising a multiplier that multiplies the electrode signal by the detection signal with any resulting DC term fed back to the energy source, wherein the energy source is responsive to the fed back DC term to control the energy application.

12. The device for detecting and displaying of claim 6 wherein the electrode is configured to receive energy from the energy source and impress a relatively high voltage electric field across the luminescent gas to control ionization of the gas and brightness of display.

13. A device for detecting and displaying a hidden object, the device comprising:
an energy source providing energy having a relatively high AC voltage;
a substantially transparent electrode configured to receive the energy from the energy source;
a chamber containing an inert luminescent gas that emits light in response to the amount of energy applied to it, the gas being placed between the electrode and the hidden object thereby providing an electrical circuit in which the luminescent gas forms a part;
a controller circuit that controls the energy applied to the electrode to maintain the gas substantially just above an ionization level at which the gas glows, the controller also controlling the application of energy to the electrode to control an effective depth of view of the gas;
wherein the gas detects the hidden object due to the change in capacitance provided by the hidden object in the circuit of which the gas is a part, and the gas displays the shape of the hidden object through the transparent electrode;
whereby the luminescent gas both detects and displays the hidden object.

14. The device for detecting and displaying of claim 13 further comprising:
a guard ring located about the electrode, the guard ring connected to the energy source to thereby shield the electrode from fringing effects, whereby electric fringing effects that would otherwise occur at the periphery of the electrode are prevented; and
a ground ring located about the guard ring, thereby providing a return for the energy source.

15. The device for detecting and displaying of claim 13 wherein the controller circuit is further adapted to control a frequency of the energy applied to the electrode so that in the case where the hidden object comprises an electric field having a second frequency, the controller sets the electrode frequency relative to the second frequency of the field to result in the gas flashing the display of the shape of the electric field.

16. The device for detecting and displaying of claim 13 further comprising:
a movable conveyor belt;
a mount disposed adjacent the belt at which the electrode and chamber are located so that the belt and items on the belt are disposed in an electrical circuit with the electrode and gas in the chamber; and
a belt movement controller configured to move the belt and items on the belt over the electrode and chamber;
wherein the device simultaneously detects and displays items on the conveyor belt.

* * * * *